Patented Jan. 17, 1939

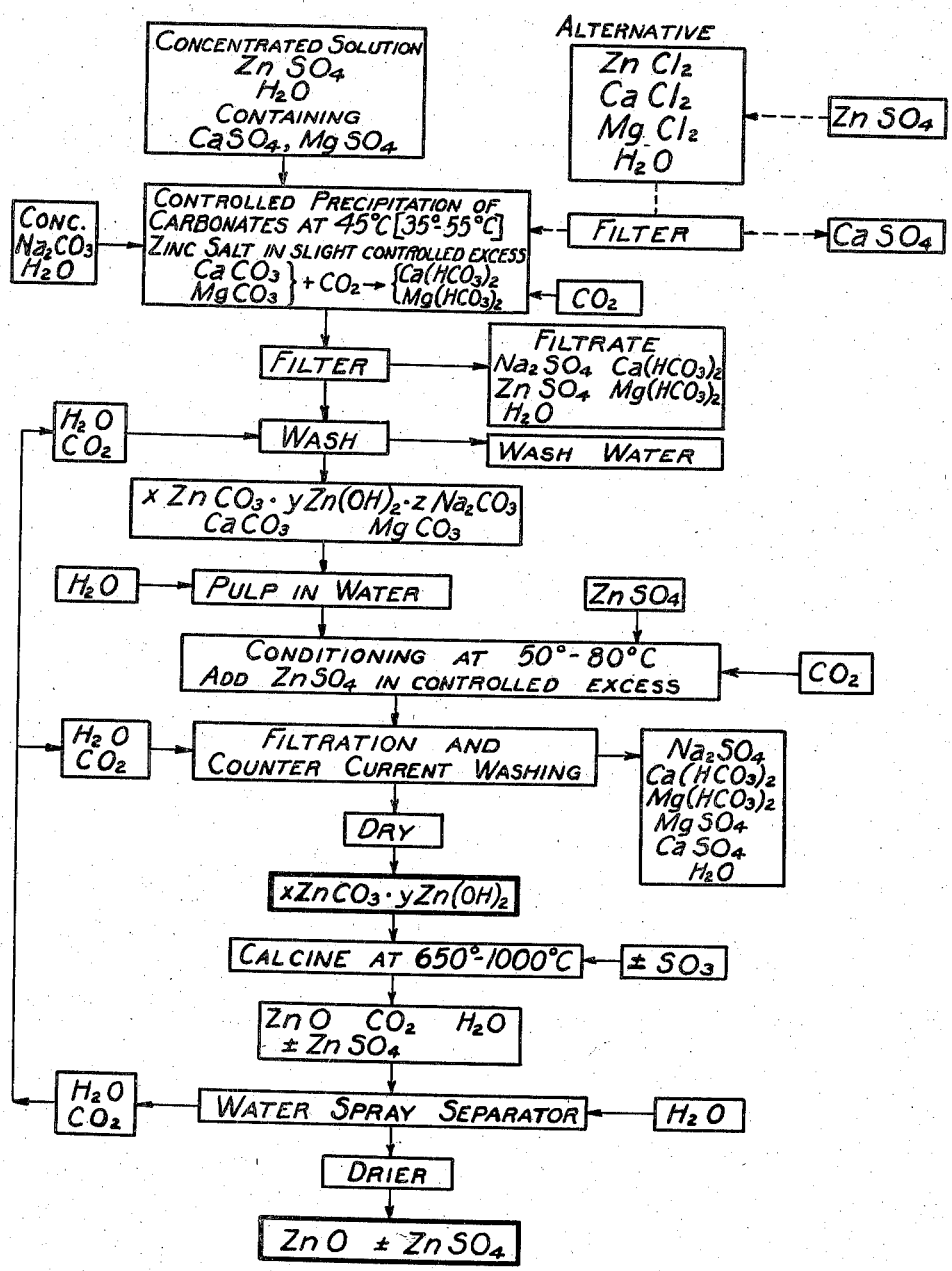

2,144,299

UNITED STATES PATENT OFFICE 2,144,299

METHOD OF MAKING ZINC CARBONATE AND ZINC OXIDE

Royal L. Sessions, Los Angeles, and Thomas A. Mitchell, Torrance, Calif., assignors to Hughes-Mitchell Processes, Incorporated, Denver, Colo., a corporation of Wyoming Application April 15, 1936, Serial No. 74,408

19 Claims. (Cl. 23—55)

This invention relates to the manufacture of zinc carbonate and zinc oxide of required physical and chemical characteristics.

Zinc carbonate may be readily precipitated from a dilute aqueous solution of zinc chloride or sulfate by means of sodium carbonate; but such a process is not wholly satisfactory because of the plant operating costs involved in the use of dilute solutions. Economical and efficient operation of the plant requires the use of concentrated solutions, but their use has heretofore presented difficult problems. When a strong solution of zinc sulfate or chloride is treated with a strong solution of sodium carbonate, a basic zinc carbonate or zinc hydroxycarbonate is formed; but the temperature and the rate at which the precipitation takes place and the relative proportions of the ingredients are now found to be of material importance. That is, if the temperature is above a critical point, which varies with the conditions of the process, the precipitated material may contain or occlude some of the zinc sulfate or chloride. At a lower temperature, some of the sodium carbonate reagent is found entrapped in the precipitate. The entrapped zinc sulfate or chloride is not readily converted to zinc carbonate by treatment with more of the sodium carbonate and it is very difficult to remove; hence, the final zinc oxide formed therefrom contains too high a sulfur content for many commercial uses. It is, therefore, desirable to so control the process as to avoid having zinc sulfate or chloride occluded in the precipitate. It is to be noted that the terms "occluded" and "entrapped" are to be interpreted broadly as not limited to any theory but merely as referring to that state of the precipitate which prevents removal of the foreign substance by a simple washing operation.

Also, unless various factors of the process are controlled, the end point of the reaction is indefinite, and a standard volume of concentrated zinc solution may require widely varying amounts of a standard concentrated sodium carbonate solution for the precipitation. Even if the reagents are employed in stoichiometric amounts, but the process is not suitably controlled, the precipitate is likely to differ in its composition from time to time, so that one batch will require treatment to remove an excess of soda, while at another time it may contain an excess of the zinc sulfate or chloride. Moreover, the volume of the filter cake and its moisture content decrease and the volume of the filtrate increases with a decrease in precipitating temperature, and they may vary widely under these different process conditions and with uncertain results. Another factor is the formation of $CO_2$ gas which varies with the temperature and affects the composition of the product. If the gas evolution is excessive, it may cause boiling over of the solution during the precipitating step. It is, therefore, important to control these variable factors, if the use of concentrated solutions is to be successful.

The primary object of this invention is to provide a satisfactory method of producing zinc carbonate by precipitation from concentrated reagent solutions and especially to provide an economical and commercially practical process in which the various problems heretofore faced in the use of strong solutions are overcome and a product of desired composition and physical properties may be obtained and duplicated at will.

Zinc oxide has been commonly manufactured by fuming zinc metal under high temperature oxidizing conditions. The present invention leads to the production of zinc oxide of similar characteristics by calcination of the zinc carbonate precipitated from a zinc salt solution. Zinc oxide has many uses in the industry, each of which requires that the material conform to certain physical and mechanical standards. When used as a pigment or as a filler for a rubber compound, it is not required as a chemically pure material but it should have certain definite properties. For example, it should incorporate readily in the rubber without sticking to the mixing equipment, and to that end it should not have an alkaline reaction. Its sulfur content, if any, should be definite and controlled, since an excessive amount reduces its resistance to aging. It should induce proper activation of the vulcanization process and not cause it to be either too fast, which prevents the rubber from making proper contact with the cotton fabric, or too slow with its resultant high manufacturing costs. Other requirements relate to the tensile strength, the degree of abrasion, the length of wearable life and the resiliency of the rubber product, which are also influenced by the size and shape of the zinc oxide particles as well as by the type and the amount of the impurities contained therein.

Further objects of this invention are therefore, to provide a hydrometallurgical method of producing a zinc oxide of neutral reaction and controlled content of impurities which is well suited for use in the commercial industries and particularly as a pigment or a filler in a rubber compound, and to vary these properties in accordance with the demands of the industry.

It is desirable that the reagent solutions be of high purity prior to the precipitation step so as to avoid the necessity for purifying the zinc carbonate or zinc oxide obtained therefrom, and suitable steps may be taken to eliminate iron, manganese and other elements in accordance with standard practice. It is, however, found that zinc chloride and sulfate as obtained from various metallurgical processes contain alkaline earth metal compounds, such as calcium and magnesium chlorides and sulfates, and that it is very difficult to eliminate these to the required extent.

A further object of this invention is, therefore, to provide a series of purification steps which serve to remove such dissolved or precipitated alkaline earth metal compounds and to produce a zinc carbonate or oxide of satisfactory purity. Other objects will be apparent in the following description of the invention.

It is found that commercially satisfactory products may be formed by the following procedure, reference being had to the accompanying drawing illustrating as a flow diagram the preferred steps which may be employed in converting a strong solution of zinc sulfate and/or zinc chloride to zinc carbonate and zinc oxide. The invention will be described primarily as applying to a zinc sulfate solution, but it will be understood that the same general steps and principles apply to the treatment of a solution of zinc chloride or a mixture of zinc chloride and sulfate in any proportions.

The preferred reagent for precipitating zinc carbonate is a concentrated solution of alkali metal carbonate, such as sodium or potassium carbonate, and particularly trona or similar natural materials. Trona is a mineral containing the carbonates of sodium associated with lesser amounts of sodium sulfate and chloride. By calcining the trona, the organic matter may be eliminated and the sodium bicarbonate may be converted to the normal carbonate; but the trona may be used in either the raw or the calcined condition, as desired. The small amounts of sodium sulfate and chloride present in the trona may be considered as inert, since they do not materially affect the reactions. The undesired elements, such as iron and manganese, if present, may be removed by suitable purification steps from all of the reagents used.

According to this invention, a concentrated aqueous solution of the zinc salt is treated with a concentrated aqueous solution of alkali metal carbonate, and preferably sodium carbonate or a solution of trona salt of suitable purification and concentration, and the process is so carried on as to produce a precipitate of zinc hydroxycarbonate, herein termed zinc carbonate, and to purify the same and produce a desired product. The precipitation is carried on under controlled conditions and at a temperature between 35° C. and 55° C. which, under required factory conditions, insures that either the precipitate will be substantially free from occluded material or it will contain the alkali metal carbonate and not the zinc sulfate or chloride. A temperature of about 45° C. satisfies the many requirements of the process and results in only a small amount of sodium carbonate being entrapped in the precipitate. The reaction is preferably terminated at that point at which a definite amount of the zinc salt reagent in the solution remains unconverted. The entrapped sodium carbonate may be later removed in a conditioning step which preferably comprises pulping the precipitate in water and treating it with a controlled amount of a desired reagent capable of forming a soluble sodium salt thereof, such as one providing chlorine, nitrate or sulfate ions. Some of the alkaline earth impurities may be eliminated from a zinc chloride solution as insoluble sulfates. Further amounts may be removed by precipitating the zinc carbonate at a controlled low temperature and in the presence of $CO_2$ gas, and the precipitate may be washed with carbonated water, so as to form the water soluble bicarbonates of the alkaline earth metals. The remaining portions may be removed as sulfates during the later conditioning and washing stages. The zinc carbonate may be calcined to form the oxide, and its sulfur or chlorine content may be controlled by regulating the amount of the excess sulfate or chlorine ions remaining at the end of the conditioning step, or by imparting the desired content thereof to the final product.

In order that the invention above outlined may be fully set forth, the following detailed description of the preferred procedure is given. If a zinc chloride solution is to be employed as the source of zinc for making the zinc carbonate, then the addition to that strong solution of a suitable amount of zinc sulfate, as shown at the upper right hand portion of the drawing, causes the precipitation of the major portion of the calcium ions that may have been dissolved in the zinc salt, after which the resultant calcium sulfate may be removed by a filtering step. The amount of zinc sulfate used for this purpose may be only sufficient to precipitate the calcium sulfate; or if desired one may use a mixed solution of zinc sulfate and zinc chloride with each present in a large proportion. This precipitation of the calcium sulfate takes place slowly, hence the mixed solution should stand for two or three days and thus allow time for the precipitate to form and to settle. Thereafter and preferably just prior to the precipitation of the zinc from solution, the calcium sulfate is removed by a filtering step. The resultant zinc chloride solution or a mixture of the chloride and sulfate solutions may be thereafter treated as described below with reference to a zinc sulfate solution.

To precipitate zinc carbonate from its sulfate solution, a definite quantity of a strong or concentrated solution of zinc sulfate, such as 32° Baumé concentration, is placed in a precipitating tank and the desired strong alkali metal carbonate solution, such as a solution of normal sodium carbonate or trona, is slowly added thereto while the bath is being thoroughly stirred or agitated. The carbonate solution may be nearly saturated, such as a 30° Bé. trona solution. The temperature is maintained low enough to prevent zinc sulfate from being occluded in the precipitate and to aid in solubilizing the alkaline earths. The temperature of 45° C. and the other preferred conditions here specified result in a small amount of sodium carbonate being entrapped in the precipitate. The sodium carbonate or trona solution is added carefully towards the end of the precipitation until one liter of the pulp of precipitate and solution contains preferably from 0.5 to 1.0 gram of soluble zinc salt, as is determined by titration of the pulp 15 minutes after the trona feed has been stopped but stirring continued. If the pulp contains about 0.7 gram of soluble zinc sulfate per liter of pulp, then only about 5 parts of $ZnSO_4$ solution will be required later to condition 100 parts by volume of the pulp. This addition of the sodium carbonate solution should take place slowly and over a considerable period of time, such as from 45 minutes to one hour for a batch of 2000 or more gallons. The reagent should be distributed widely and added in small increments, as by means of a spray pipe above or within the solution, to insure that the sodium carbonate is never locally in great excess over the zinc sulfate. This control of the addition of the trona minimizes the amount of the double salt of sodium and zinc carbonate formed.

The precipitate is considered to be zinc hydroxycarbonate in which the relative proportions of carbonate and hydroxyl vary according to the temperature of reaction and proportions of the reagents and other conditions of the process. Furthermore, the temperature and the rate of precipitation, as well as the local concentration of the reagents which varies with the rates of stirring and adding of the reagent, affect the size and nature of the particle; and it is ordinarily desirable to maintain the conditions herein set forth to produce a precipitate of low density and a suitable particle size for the ZnO to be used as an activator and a pigment. If the precipitate contains too much sodium carbonate, the crystalline structure is denser and results in a denser zinc oxide. The temperature range of 35° to 55° C. for precipitation gives the most desirable apparent densities. Below this range, the precipitate is too dense for many uses, and above it, the material contains too much water that must be evaporated. At temperatures near and particularly below 45°, the volume of the filter cake and its water content are substantially constant and thus permit uniform filtering conditions.

Under these conditions, the amount of sodium carbonate used is more than the stoichiometric requirements for the reaction, although some of the zinc sulfate remains unprecipitated. It is believed that the excess of sodium carbonate entrapped in the precipitate exists as a component part of a complex compound consisting of zinc hydroxycarbonate and sodium carbonate, since the precipitate is neutral in its reaction. This compound may be considered to have the formula $xZnCO_3 \cdot yZn(OH)_2 \cdot zNa_2CO_3$ and is herein termed zinc sodium carbonate.

It is to be particularly noted that the conditions of the precipitation step are such that the entrapped or occluded compound is sodium carbonate and not zinc sulfate. This has no reference to the slight amount of either reagent solution which may be temporarily intermixed with the precipitate and is easily removed when the precipitate is washed. Although an excess of the alkali metal carbonate over the stoichiometric requirements may be used, yet the reaction is stopped short of the conversion of all of the zinc in solution into zinc carbonate, so that the pulp of precipitate and solution contains both sodium carbonate and zinc sulfate. This involves careful manipulation to have the resultant pulp neutral in its reaction. By holding the temperature fairly close to a selected point and by limiting the rate of soda addition as above defined, the amount of reagent later required in the conditioning treatment to neutralize the entrapped sodium carbonate is kept small, thus reducing the expense and difficulties inherent in neutralizing large amounts of this contaminating material.

This precipitation step may result in throwing down the carbonates of the alkaline earth metals, and particularly calcium and magnesium, which were present in the solution. However, the temperature employed should result in setting free some carbon dioxide from the sodium carbonate solution, and this excess of $CO_2$ and the presence of the complex sodium carbonate in the pulp results in some of the normal calcium and magnesium carbonates being converted to the more soluble bicarbonates which dissolve in the water present. Consequently, some of the undesired alkaline earth metals go with the solution during the subsequent filtering and washing operations. If the precipitation is carried on at room temperature, about 85% of the magnesium goes into solution as a bicarbonate. As the temperature is increased, some of the bicarbonate breaks down and precipitates the normal carbonate. Hence, it is desirable to keep the precipitating temperature as low as is consistent with other required conditions of the process. If for other reasons the temperature should be held at too low a point for this purpose, $CO_2$ gas may be introduced from an outside source. This step is of such importance that other conditions of the precipitating stage should be controlled in so far as feasible to insure the elimination of the alkaline earths.

After precipitating the zinc carbonate, the strong solution is removed, and preferably without dilution thereof, so that its valves may be easily recovered. This may be accomplished by means of any suitable apparatus, such as an Oliver filter. Then the filter cake may be suitably washed with water to remove a further amount of the soluble salts. The excess of zinc sulfate as well as the soluble alkaline earth metal bicarbonates formed in the precipitating bath go with the filtrate and wash waters and may be suitably treated in other operations. If desired, wash water containing $CO_2$ derived from a later step in the process may be used at this point so as to further solubilize the alkaline earths.

The next step involves conditioning the pulp to remove the sodium carbonate which is combined or entrapped in the precipitate, as well as to remove calcium and magnesium carbonates that are still present. To this send, the washed filter cake is repulped in water, the water content being such that the bath will contain less than 1° Bé. of water soluble salts. This addition of water and agitation of the mass opens up the pulp and exposes the alkali metal carbonate content thereof for further treatment. That is, the pulp may be now considered to comprise a dilute solution containing ions of great chemical activity, whereas the former precipitation step was accomplished by means of strong solutions which formed and could not break down the complex zinc sodium compound. The pulp in its active state is then conditioned with a reagent which is capable of and is proportioned for removing the alkali metal as a soluble salt, and preferably with a reagent which leaves the carbonate radical as a further amount of zinc carbonate.

This conditioning operation preferably involves heating the water diluted pulp to a temperature of from 50° C. to 80° C. and preferably at about the temperature of 75° C. at which carbon dioxide will be readily evolved; or, if desired, $CO_2$ may be introduced from an outside source. Then zinc sulfate or equivalent reagent is added slowly to the tank while the liquor is stirred vigorously until the $CO_2$ ceases effervescing, and the material is neutral to phenolphthalein. It is preferable that the $ZnSO_4$ be added until the pulp finally contains at least 1.5 grams of soluble zinc as sulfate per liter of pulp as determined by titration after twenty minutes of stirring the material following the addition of the conditioning reagent. The $ZnSO_4$ reacts with the exposed sodium carbonate portion of the precipitate and forms zinc carbonate, together with sodium sulfate which dissolves in the bath and so leaves the zinc hydroxycarbonate purified therefrom. As equivalents of the $ZnSO_4$ herein specified as the conditioning reagent for removing the sodium carbonate and form a soluble sodium salt, one may use $ZnCl_2$, $Zn(NO_3)_2$, $NaHSO_4$, $H_2SO_4$, $HCl$, $HNO_3$, or other suitable salts and acids or mixtures thereof which provide the sulfate, nitrate or chlorine ions, and the claims are to be interpreted accordingly.

Owing to the excess of $ZnSO_4$ maintained in the pulp at this stage, the calcium and magnesium salts present are converted to the corresponding sulfates. Any $MgSO_4$ formed is water soluble and goes with the filtrate. The calcium sulfate precipitate is later removed from the pulp by a countercurrent washing operation as is well understood. Also, during this washing step, a carbonated wash water is preferably used and this as well as the $CO_2$ evolved further aids in solubilizing the undesired alkaline earths, as above explained. Thus, by this third step, substantially all of the remainder of the alkaline earth material has been removed from the zinc carbonate.

The importance of this conditioning step will, therefore, be apparent, since it results in the final purification of the pulp by removing both the sodium carbonate and the alkaline earth metal compounds still entrapped therein. Moreover, it will be appreciated that these purification steps may be used for treating zinc carbonate derived from other sources, and that the specific steps herein described for obtaining the zinc carbonate may be suitably modified or replaced by other methods of procedure.

The amount of zinc sulfate finally existing at the end of the conditioning step may be made dependent upon the desired sulfur acidity later required in the final ZnO product. By this means, one may control the sulfur or $ZnSO_4$ content of the zinc oxide. For example, one may add enough $ZnSO_4$ to have a final excess of 1½ grams of zinc as sulfate per liter of pulp after stirring for twenty minutes and thus obtain a zinc oxide which is satisfactory for various commercial uses as pigments and rubber fillers. Under these conditions, the washed zinc carbonate will contain approximately 0.5% of sulfur which is present largely as zinc sulfate, and when the dry zinc hydroxycarbonate is ultimately calcined, the zinc oxide will contain about 0.2% by weight of sulfur depending upon the temperature of calcination. A sulfur content of 0.12 to 0.14% is desirable for use in rubber and to form this type of ZnO, the sulfur additions are made more limited in amount. Similarly, a chlorine content may be imparted to the ZnO, if desired, by the required addition of zinc chloride in accordance with the above principles.

After this conditioning step, the pulp is then filtered in any suitable apparatus and washed to remove the water soluble salts, and the cake is thereafter repulped and sent to a Dorr thickener for further washing in a countercurrent system by means of a large volume of water. The calcium sulfate previously precipitated is there removed from the zinc carbonate. The water used in this washing system is preferably obtained from the later dust recovery step of the process and so contains carbon dioxide gas which was evolved in the drying and calcining units. This carbonated water aids in solubilizing any calcium or magnesium carbonate which remains and so causes them to pass out with the wash water and be removed from the zinc carbonate. The zinc hydroxycarbonate made as above described, when dried, will contain about 14% of $CO_2$ which is the usual content desired for the standard commercial product. After the material has been suitably washed, it is passed to a filter and then to a dryer where the water is removed to a desired extent, such as 0.5% water content. An end temperature of 130° C. is suitable for this purpose. The dry material is then available for use as zinc carbonate.

A further feature of the invention involves the production of zinc oxide from this hydroxycarbonate, and this is accomplished by calcining the material under required temperature conditions. A temperature between 900° and 1000° C. will produce a zinc oxide of standard ability for activating a vulcanization accelerator. As the temperature decreases, the activation will be increased. If the zinc hydroxycarbonate is calcined at a dull red heat (from 650° C. to 900° C.) the resulting zinc oxide, when incorporated in rubber, will give a required activation, high tensile strength, high flexing life and an increased resistance to aging and abrasion. It is therefore important to so control the calcination temperature of this particular zinc compound as to make an oxide of desired physical and chemical characteristics. This control is so accurate that the various types of zinc oxide manufactured by fuming and oxidizing zinc metal may be duplicated by this procedure. The calcination may be accomplished in any suitable apparatus, such as a rotary calciner, and the various control conditions well known in the industries may be employed.

The zinc oxide dust which comes from the calciner may be recovered in a suitable collecting system, such as a cyclone separator of standard design, where the air and the carbon dioxide gas resulting from the calcining step are separated from the zinc oxide. As indicated in the drawing, the furnace gases may be passed through a wet collector to remove the zinc oxide, and where the carbon dioxide gas will be absorbed in a water spray provided for the purpose. This carbonated water is then available for return to the system for treating the pulp as above described. Thereafter the wet zinc oxide may be dried and otherwise treated, as desired.

If one uses mixed solutions of zinc chloride and sulfate for initial reagents, it is found that this process results in a product having zero or a very low chlorine content. The sulfur acidity (zinc sulfate content) of the zinc oxide may be made whatever is desired by a proper control of the process. It is found that in the calcining and drying operations, the sulfur in the fuel tends to increase the sulfur content of the zinc carbonate and oxide by a direct contact therewith. Hence, by properly coordinating the precipitating temperature, the rate of reaction, the amounts of the reagents and other conditions of the step of precipitating the zinc carbonate, with the sulfur content of the fuel, as determined by chemical analysis, the acidity of the zinc oxide may be carefully controlled. This sulfur content may be further modified by blending the zinc oxides made up by different manufacturing procedures. Also, the atmospheres of the drying and calcining kilns may be controlled by introducing and imparting a definite content of sulfur trioxide and/or dioxide gas thereto. This makes it feasible to produce a zinc carbonate of low but controlled sulfur content and to convert the same during calcining to zinc oxide containing a desired amount of a zinc sulfur compound. Hence, the chemical composition of the zinc oxide or zinc carbonate may be readily varied. Also the physical characteristics, such as the size and nature of the particle itself will be controlled to a large extent by controlling the rate of the reaction during precipitation, the rate at which the materials are stirred, and other factors as above explained.

We claim:

1. The method of making zinc carbonate comprising the steps of treating a concentrated aqueous solution of a zinc salt of the group consisting of zinc sulfate, zinc chloride and a mixture thereof with sufficient concentrated aqueous solution of alkali metal carbonate for reacting with substantially all of the zinc salt, while maintaining the temperature between 35° C. and 55° C. and stopping the addition of the reagent when only a slight amount of zinc salt remains unconverted, and causing the formation of a precipitate of basic zinc carbonate containing an alkali metal compound, and thereafter treating the precipitate with a reagent containing ions of the group consisting of sulfate, nitrate and chloride ions which is capable of and proportioned for removing the alkali metal carbonate therefrom, and recovering the precipitate.

2. The method according to claim 1 in which the alkali metal carbonate is added in such an amount that the final solution contains from 0.5 to 1.0 gram of unreacted zinc salt per liter of pulp.

3. The method of making zinc carbonate comprising the steps of treating a concentrated aqueous solution of a zinc salt of the group consisting of zinc sulfate, zinc chloride and a mixture thereof with approximately a stoichiometric amount of a concentrated aqueous solution of alkali metal carbonate at a temperature between 35° C. and 55° C., while stirring the bath and adding the last portion of the reagent slowly and in small increments locally, and stopping the addition of the reagent at a point at which only a slight controlled excess of the initial zinc salt solution remains in the pulp, thereafter removing the solution and treating the precipitate in an aqueous suspension with a reagent providing sulfate ions which removes the alkali metal from the precipitate as a sulfate, and recovering the zinc carbonate.

4. The method of making zinc carbonate from a concentrated solution of a zinc salt of the group consisting of zinc sulfate, zinc chloride and a mixture thereof which contains an alkaline earth metal compound, comprising the steps of treating the solution with substantially a stoichiometric amount of a concentrated solution of sodium carbonate at a temperature between 35° and 55° C. and producing a pulp containing a small amount of unconverted zinc salt in solution and a precipitate of zinc carbonate contaminated with sodium and alkaline earth metal carbonates, removing the solution and treating the precipitate at a temperature between 50° C. and 80° C. with a reagent providing sulfate ions and converting sodium and alkaline earth metal carbonates to the corresponding sulfates and thereafter recovering the precipitate.

5. The method according to claim 4 in which any calcium sulfate formed by reaction of a calcium carbonate impurity in the pulp with the sulfate ions is removed by a countercurrent washing operation and thus separated from the zinc carbonate.

6. The method of making zinc carbonate comprising the steps of mixing a concentrated aqueous solution of a zinc salt of the group consisting of zinc sulfate, zinc chloride and a mixture thereof and a concentrated solution of alkali metal carbonate, while maintaining the temperature between 35° C. and 55° C. and causing the precipitation of zinc carbonate free from occluded zinc salt reagent, and thereafter treating the precipitate with a dilute aqueous solution of a reagent containing ions of the group consisting of sulfate, nitrate and chloride ions which is capable of and proportioned for removing any alkali metal carbonate which may be present and recovering the zinc carbonate.

7. The method according to claim 1 in which the precipitating temperature is maintained between 35° C. and 45° C.

8. The method according to claim 1 in which the precipitating temperature is maintained between 35° C. and 45° C. and the precipitate is conditioned with a water solution of a reagent providing ions of the group consisting of sulfate, chlorine and nitrate ions which is capable of and is proportioned for removing the alkali metal carbonate as a soluble salt.

9. The method of making zinc carbonate comprising the steps of providing a concentrated aqueous solution of zinc salt of the group consisting of zinc sulfate, zinc chloride and a mixture thereof, adding slowly thereto substantially a stoichiometric amount of a concentrated aqueous solution of alkali metal carbonate and stopping the addition of the reagent when a slight amount of zinc salt reagent remains unconverted, while maintaining a precipitating temperature between 35° C. and 55° C. and causing the formation of basic zinc carbonate containing an alkali metal compound, and thereafter suspending the precipitate in a large mass of water and there conditioning it with a dilute aqueous solution of a reagent providing ions of the group consisting of sulfate, chlorine and nitrate ions in amount sufficient to neutralize the alkalinity of the mass and remove the alkali metal as a water soluble salt, and thereafter recovering the precipitate.

10. The method according to claim 9 wherein the precipitate is conditioned at a temperature between 50° C. and 80° C.

11. The method of treating a zinc carbonate contaminated with an alkaline earth metal carbonate comprising the steps of claim 9 wherein the precipitate suspended in water is treated with carbon dioxide gas to convert the alkaline earth metal carbonate to the water soluble bicarbonate, and the precipitate is recovered from the solution.

12. The method of making zinc carbonate from a concentrated solution of a zinc salt contaminated with a dissolved alkaline earth metal salt comprising the steps of adding a concentrated solution of alkali metal carbonate thereto and precipitating zinc hydroxycarbonate, treating the material with carbon dioxide and forming a water solution of a bicarbonate of some of the alkaline earth metal that is present, separating the precipitate from the solution, treating the still contaminated precipitate with a reagent containing ions of the group consisting of sulfate, nitrate and chloride ions to convert alkaline earth metal carbonate to a salt corresponding with said reagent, and separating the same from the zinc hydroxycarbonate.

13. The method of making zinc carbonate from a concentrated zinc chloride solution contaminated with calcium and magnesium compounds comprising the initial treatment of the solution with zinc sulfate and the removal of the calcium sulfate by filtration, after which the solution is treated in accordance with the steps of claim 12 whereby the alkaline earth metals are dissolved from the precipitate as water soluble bicarbonates.

14. The method of making and purifying zinc carbonate from a concentrated solution of a zinc salt of the group consisting of zinc sulfate, zinc chloride and a mixture thereof, which contains an alkaline earth metal compound, comprising the steps of treating said solution with a concentrated solution of alkali metal carbonate and precipitating the carbonates of zinc and the alkaline earth metal, treating the precipitate in aqueous suspension with carbon dioxide gas and converting some of the alkaline earth metal carbonate to the water soluble bicarbonate, removing the solution, treating the precipitate in water suspension with zinc sulfate in solution and forming alkaline earth metal sulfate, and recovering the zinc carbonate.

15. The method according to claim 1 in which the precipitate is treated with $CO_2$ in the presence of water following its removal from the resultant solution present at the end of the precipitating stage.

16. The method of making zinc carbonate from a concentrated solution of a zinc salt contaminated with a dissolved alkaline earth metal salt comprising the steps of adding a substantially stoichiometric amount of a concentrated solution of an alkali metal carbonate at a temperature between 35° C. and 55° C. and stopping the addition of the reagent when only a slight amount of the reagent zinc salt remains in solution and thereby precipitating zinc carbonate contaminated with alkali metal and alkaline earth metal compounds, thereafter treating the precipitate with a dilute aqueous solution of a reagent providing ions of the group consisting of sulfate, chlorine and nitrate ions and removing alkali metal compound from the precipitate, treating the precipitate with $CO_2$ in the presence of water to convert an alkaline earth metal carbonate to the bicarbonate and dissolve the same, and thereafter separating the dissolved salts from the precipitate and recovering the latter.

17. The method of making zinc oxide comprising the steps of mixing concentrated aqueous solutions of a zinc salt of the group consisting of zinc sulfate, zinc chloride and a mixture thereof and an alkali metal carbonate at a temperature between 35° C. and 55° C. and forming zinc hydroxycarbonate containing an alkali metal compound, treating the precipitate with an excess of aqueous solution of a reagent providing sulfate ions to dissolve the alkali metal compound, and thereafter calcining the precipitate at a high temperature to convert the zinc carbonate and sulfate to zinc oxide.

18. The method of making zinc oxide comprising the steps of mixing concentrated aqueous solutions of a zinc salt of the group consisting of zinc sulfate, zinc chloride and a mixture thereof and an alkali metal carbonate at a temperature between 35° C. and 55° C. and forming zinc hydroxycarbonate containing an alkali metal compound, treating the precipitate with an excess of aqueous solution of a reagent providing sulfate ions to dissolve the alkali metal compound and incorporate a definite quantity of zinc sulfate in the precipitate, and thereafter calcining the same below the temperature of decomposition of zinc sulfate to convert the zinc carbonate to the oxide and form a mixture thereof with a controlled content of zinc sulfate.

19. The method of making zinc carbonate from a zinc salt solution contaminated with salts of metals of the group consisting of calcium and magnesium comprising the steps of treating the same with sodium carbonate in solution and precipitating zinc and alkaline earth metal carbonates, removing the precipitate from the resultant solution and conditioning the precipitate with carbon dioxide at a temperature at which an alkaline earth metal carbonate is converted to the more soluble bicarbonate and further conditioning the precipitate with a reagent providing sulfate ions to convert alkaline earth metal carbonate to the sulfate, separating said alkaline earth metal compounds from the zinc carbonate and recovering the latter.

ROYAL L. SESSIONS.
THOMAS A. MITCHELL.